United States Patent [19]
Grice et al.

[11] Patent Number: 5,426,754
[45] Date of Patent: Jun. 20, 1995

[54] CROSS-INTERROGATE METHOD AND MEANS FOR COMBINED SCALER AND VECTOR PROCESSING SYSTEM

[75] Inventors: Donald G. Grice, Kingston; Donald W. Price, Lake Katrine, both of N.Y.; Reza S. Raji, Palo Alto, Calif.

[73] Assignee: International Business Machines Corporation, Armonk, N.Y.

[21] Appl. No.: 889,022

[22] Filed: May 26, 1992

[51] Int. Cl.⁶ .................................... G06F 13/00
[52] U.S. Cl. .................... 395/425; 364/DIG. 1; 364/228.1; 364/230.5; 364/232.21; 364/243.45; 364/247.8; 364/DIG. 2; 364/931.4; 364/931.46; 364/931.51; 364/931.52
[58] Field of Search ........... 395/425; 364/200 MS, 364/900 MS

[56] References Cited

U.S. PATENT DOCUMENTS

| | | | |
|---|---|---|---|
| 4,394,731 | 7/1983 | Flusche et al. | 364/200 |
| 4,803,620 | 2/1989 | Inacani et al. | 395/425 |
| 5,032,985 | 7/1991 | Curran et al. | 395/425 |
| 5,123,095 | 6/1992 | Papaoopoulos et al. | 395/375 |
| 5,230,070 | 7/1993 | Liu | 395/425 |
| 5,263,144 | 11/1993 | Zuranski et al. | 395/425 |
| 5,276,828 | 1/1994 | Dion | 395/425 |
| 5,293,602 | 3/1994 | Fukagawa et al. | 395/425 |

OTHER PUBLICATIONS

Gannon et al., "Cross-Invalidate Directory Method and Means", Patent Application Ser. No. 07/679,900, filed Apr. 3, 1991.
Bean et al., "Ownership Interlock for Cache Data Units". Patent Application Ser. No. 07/680,176, filed Apr. 3, 1991.

*Primary Examiner*—David L. Robertson
*Assistant Examiner*—Frank J. Asta
*Attorney, Agent, or Firm*—Floyd A. Gonzalez

[57] ABSTRACT

A combined scalar and vector processing system is provided including a scalar XI directory which records the lines currently being stored into by the scalar processors and vector store register devices (VSR) which record lines currently being stored into by vector processors wherein both vector and scalar XI requests are compared to those addresses stored in the vector store register devices. If there is a compare at a VSR, any responses normally provided from the scalar XI directory are held until the vector store register device receives a release signal from the vector processor indicating said vector processor is finished to thereby prevent the scalar processors from fetching invalid data.

21 Claims, 6 Drawing Sheets

FIG.2
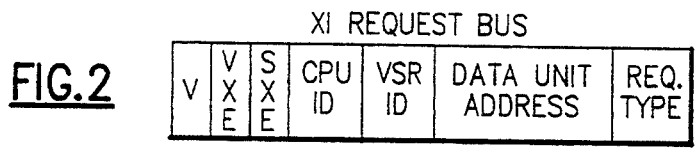
FIG.3
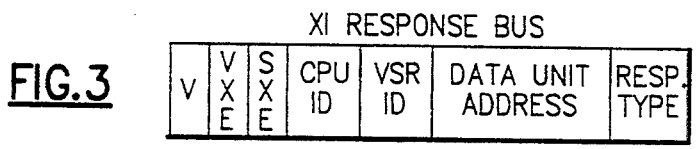
FIG.4
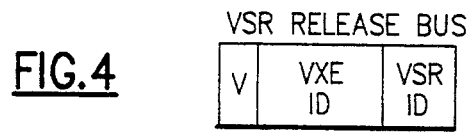
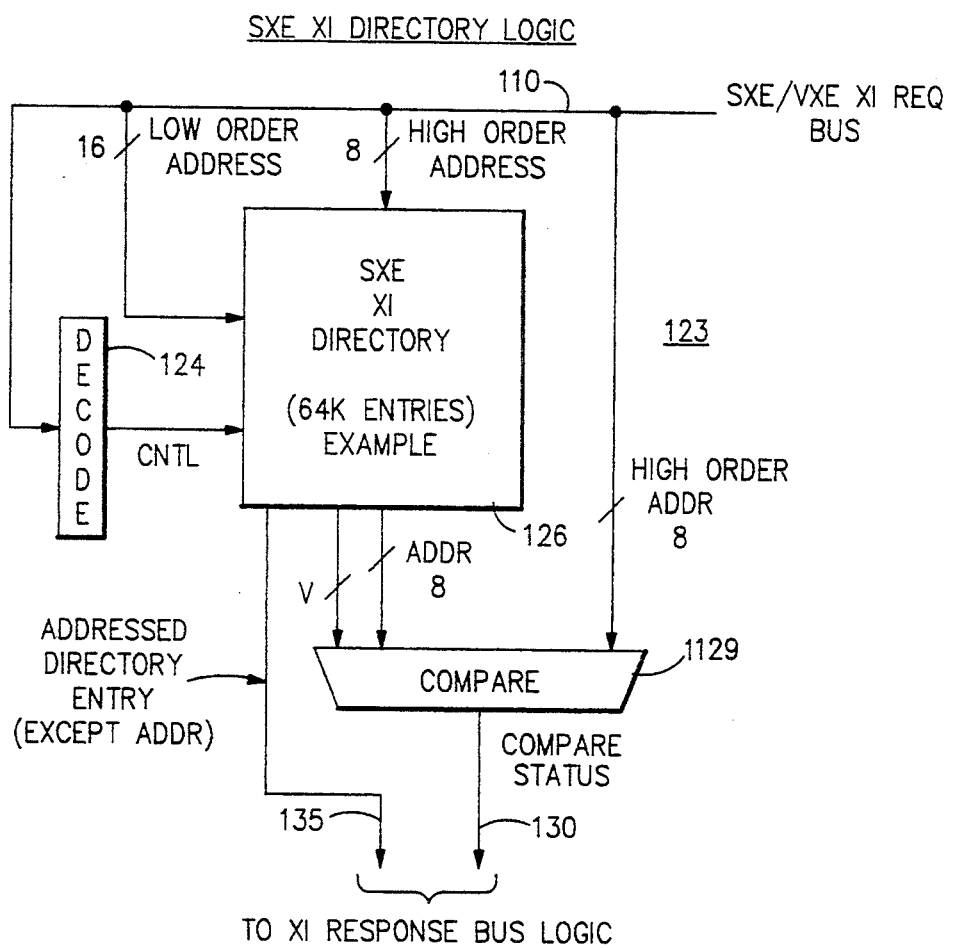
FIG.6

CROSS-INTERROGATE METHOD AND MEANS FOR COMBINED SCALER AND VECTOR PROCESSING SYSTEM

In multiple processor systems that use first level processor caches there exists what is known as the data integrity or cache coherency problem where the contents of memory storage and the corresponding copies of this data existing in the several caches must be kept consistent. Inconsistency can arise whenever one processor stores either into memory or into its local cache without ensuring that all other copies of memory data (in other processors' caches) are either marked invalid (obsolete) or are concurrently updated. This invention addresses this problem for high performance, supercomputer systems with multiple execution units.

BACKGROUND OF THE INVENTION

In high performance multiple processor systems comprised of processors wherein each processor contains one or more Scalar Execution Elements (SXE) and one or more Vector Execution Elements (VXE) it is highly advantageous for the SXEs to access memory through a first level data cache and for the VXEs to fetch and store data directly to system memory bypassing the data cache. This is particularly true in a "tightly coupled" MP (multiprocessor) system designed primarily for large high end scientific and engineering applications and high performance (supercomputers).

The above is true for several reasons. A cache is required for performance on scalar only applications and for those scalar portions of primarily scientific applications. For highly parallel applications dominated by VXE operations the data cache capacity, bandwidth, and cache blocking mechanisms can severely limit performance, and it is important that the VXEs "pipeline" operand requests directly to and from system memory. This introduces two significant system design requirements:

(a.) Due to VXE traffic, the system memory design must accommodate a higher number of operand requests than in a design where all requests go through a first level data cache.

(b) In order to ensure "cache coherency" the system must provide a centralized Data Integrity mechanism capable of servicing a very high VXE request traffic rate.

Present multiple processor supercomputer designs avoid the cache coherency problem either by avoiding the inclusion of conventional scalar data caches in their design, or if they have caches, impose the coherency solution on the software operating system and/or application. If designed without a cache, the memory access is minimized by using an expensive high performance static KAM memory chip. These approaches limit the range of applications for which these designs produce high performance results and/or introduce considerable added complexity in software. Prior multiple-processor systems have used processor-private store-in L1 caches, and they have maintained the coherence of data in the system by using a set of copy directories, which are copies of all L1 cache directories. Each processor's fetch request is cross-interrogated in the copy directories of all other processors to find if any other processor has a copy of a requested data unit. This process assures that only one processor at a time can have exclusive (EX) ownership for writing in a data unit in the system. Only the one processor the at has exclusive ownership of a data unit is allowed to write into the data unit. A data unit can also have public ownership (previously called read only (RO) authority) which allows all processors to read (fetch) the data unit, but prohibits all processors from writing into the data unit.

The data coherence problem is simpler with a store-through type of cache, which requires all stores made in the L1 cache also be concurrently made in a backing memory. The memory backing the L1 private processor caches may be an L2 shared memory, or it may be the L3 main memory. The shared L2 cache may be store-in or store-through, but preferably is store-in to reduce the store bus traffic to main memory.

The store-in type of cache has been used in computer systems because it requires less bandwidth for its memory bus (between the memory and the cache) than is required by a store-through type of cache for the same frequency of processor accesses. Each cache location may be assigned to a processor request and receive a copy of a data unit fetched from system main memory or from another cache in the system. With a store-in cache, a processor stores into a data unit in a cache location without storing into the correspondingly addressed data unit in main memory, which causes the cache location to become the only location in the system containing the latest changed version of the data unit. The processor may make as many stores (changes) in the data unit as its executing program requires. The integrity of data in the system requires that the latest version of any data unit be used for any subsequent processing of the data unit.

A store-through type of cache is used only for fetching, and maintains the latest version of their accessed data units by having all store accesses change both the processor's store-through cache as well as the same data unit in a memory (another cache or main storage) at the next level in the system storage hierarchy. But the store-through characteristic of such caches do not solve the coherence problem in the system since another processor's store-through cache could contain an older version of the same data unit. Therefore, cross-interrogation of the contents of private processor caches in multiple processor systems is needed whether they are store-in or store-through when a new request is being fetched into a processor cache.

Exclusive ownership (authority to change a cache data unit) is assigned to any processor before it is allowed to perform its first store operation in a data unit. The assignment of processor ownership has been conventionally done by setting an exclusive (EX) Flag bit in a cache directory (sometimes called a tag directory) associated with the respective data unit in the cache. The EX flag bit's ON state typically indicates exclusive ownership and the off state of the EX Flag bit indicates public ownership (called. "read-only authority"). Exclusive ownership by a processor allows only it to store into the data unit, but public (read-only) ownership of a data unit does not allow any processor to store into that data unit and it is up to all processors in the system to read that data unit (which can result in multiple copies of the non-changeable data unit in different processor caches in the system).

Typically, a cache Fetches data units from its storage hierarchy on a demand basis, and a processor cache miss generates a fetch request which is sent to the next level in the storage hierarchy for fetching the data unit.

A store-in cache transmits its changed data units to main memory under control of cache replacement controls, sometimes called the LRU controls. Replacement of the data unit may occur when it has not been recently accessed in the cache, and no other cache entry is available for the new request. This replacement process is sometimes called "aging out" when a least recently used (LRU) entry is chosen to be replaced with a new request. The replacement controls cause the data unit (whether changed or not) in the selected entry to be replaced by another data unit (Fetched as a result of a cache miss). When the data unit to be replaced in the cache has been changed, it must be castout of the cache and written into another place such as main memory before it is lost by being overwritten by the newly requested data unit being fetched From main memory. For example, a processor may request a data unit not currently in the cache, which must be fetched from main memory (or from another cache) using the requested address and stored in the newly assigned LRU cache location. The cache assignment of a location for the new data unit will be in a cache location not in current use if one can be found. If all of the useable cache locations are currently occupied with changed data units, then one of them must be reassigned for the new request. But before the new data unit can be written into the cache location, a castout to main memory is required of the updated cache data unit in that location. The castout process must then be used before the new data unit is written into the cache. The castout data unit has its ownership changed from an exclusive processor ownership to a main memory ownership.

If a data unit is not changed in the cache, it is merely overlayed to replace it without any castout, since its backing copy in main memory is identical.

U.S. application patent No. 4,394,731 to Flusche et al teaches the use of an exclusive/read only (EX/RO) flag in each entry in each private processor store-in cache directory for data coherence control in a computer system. A copy directory was provided for each processor's private L1 directory to identify the respective processor ownership of all data units currently in its cache, and the set of all processor copy directories was used to recognize which processor owned, or was publicly using, a data unit being requested exclusively by another processor in the system. Cross-interrogation (XI) was the process used among the copy directories to identify which, it any, processor had exclusive or public ownership of any data unit, which was done by comparing the address of a requested data unit with addresses in all copy directories. If the requested address was found in a copy directory, it identified a processor cache having that data unit. And cross-invalidation signaling was done from the identified processor's copy directory to its L1 cache to invalidate the entry for that data unit before passing the ownership of the data unit to another processor's cache.

This XI process assured exclusivity of a data unit to only one processor at a time by invalidating any copy of the data unit found in any other processor's private cache.

Hence, only one of the plural processors in a multiprocessing (MP) system can have exclusive ownership (write authority) at any one time over any data unit. The exclusive ownership over any data unit may be changed from one processor to another when a different processor requests exclusive ownership. The prior mechanism for indicating exclusive ownership for a processor was to provide an exclusive (EX) flag bit in each L1 directory entry in a processor's private L1 cache; and the EX bit was set on to indicate which of the associated data units were "owned" by that processor. The reset state of the EX flag bit indicated public ownership, which was called "read only authority" for the associated data unit that made it simultaneously available to all processors in the system. Thus, each valid data unit in any processor's private LI cache had either exclusive ownership or public ownership.

The copy-directory XI technique of prior U.S. Pat. No. 4,394,731 automatically assigned the following ownership to a data unit fetched from main storage into a processor's private L1 store-in cache:

1. EX ownership when the data unit is not found in any processor's copy directory.
2. EX ownership when the data unit is found changed with EX ownership in another processor's copy directory. The requested data unit is castout of the other processor's cache before it is fetched into the requesting processor's cache.
3. RO ownership when the data unit is found not changed with EX ownership in another processor's copy directory, and the new request is deemed not likely to change the data unit (fetch request). Also, the found data unit is left in its cache where its ownership is changed from EX to RO.
4. EX ownership when the data unit is found with RO ownership in one or more other processor's copy directories, and the new request is deemed to likely change the data unit (store interrogate request). The found data unit is invalidated in the other processor's cache. This XI operation uses a time-consuming process called "promote to exclusive".
5. RO ownership when the data unit is found with RO ownership in another processor's copy directory. Also, the found data unit is left in its processor's cache with its RO ownership.
6. RO ownership when the data unit is a page table entry found with RO public ownership set in the entry, regardless of the type of processor request.

Designs such as those illustrated in Gannon et al. U.S. Pat. No. 5,265,232, issued Nov. 23, 1993 for "Coherence Control by Data Invalidation in Selected Processor Caches Without Broadcasting to Processor Caches Not Having the Data", although logically solving the cache coherency problem, again limit performance by requiring all memory requests to go through the first level cache as explained above.

Patent application of Bean et al. (Application Ser. No. 07/680,176), filed Apr. 3, 1991, entitled "Ownership Interlock for Cache Data Units" and assigned to the same assignee describes and claims an ownership interlock control for cache data units. It interlocks a change of ownership for an exclusively-owned data unit in a store-in cache with the completion of all stores to the data unit issued by its processor up to the time it responds to a received cross-invalidate (XI) signal caused by another processor requesting the data unit either exclusively or witch public ownership.

The object of this invention is to provide a means and method of solving the cache coherency problem and still allowing "pipelined" operand VXE requests directly to system memory thus preserving the advantages available from scalar data caches and also yielding the advantages of conventional supercomputer designs. With this approach the resulting hardware system design is optimized over a much broader range of applications and does not impose on system software the task of ensuring data integrity.

SUMMARY OF THE INVENTION

In accordance with one embodiment of the present invention, the system comprises memory, vector processors and scalar processors with their own cache. The system includes cross-interrogate (XI) means between the scalar processors for assuring the latest copy is stored in the memory and cache. The cross-interrogate means has an XI table that contains the status off the cached lines in the scalar processors. The system includes vector store register devices that record the lines that are currently being stored into by the vector processors for preventing the scalar processors from fetching invalid data.

BRIEF DESCRIPTION OF THE DRAWINGS

FIG. 2 illustrates the message format on the XI request bus.

FIG. 3 illustrates the message format on the XI response bus.

FIG. 4 illustrates the message format on the release bus.

FIG. 6 illustrates the SXE XI directory logic.

DETAILED DESCRIPTION OF A PREFERRED EMBODIMENT

Figure 1:
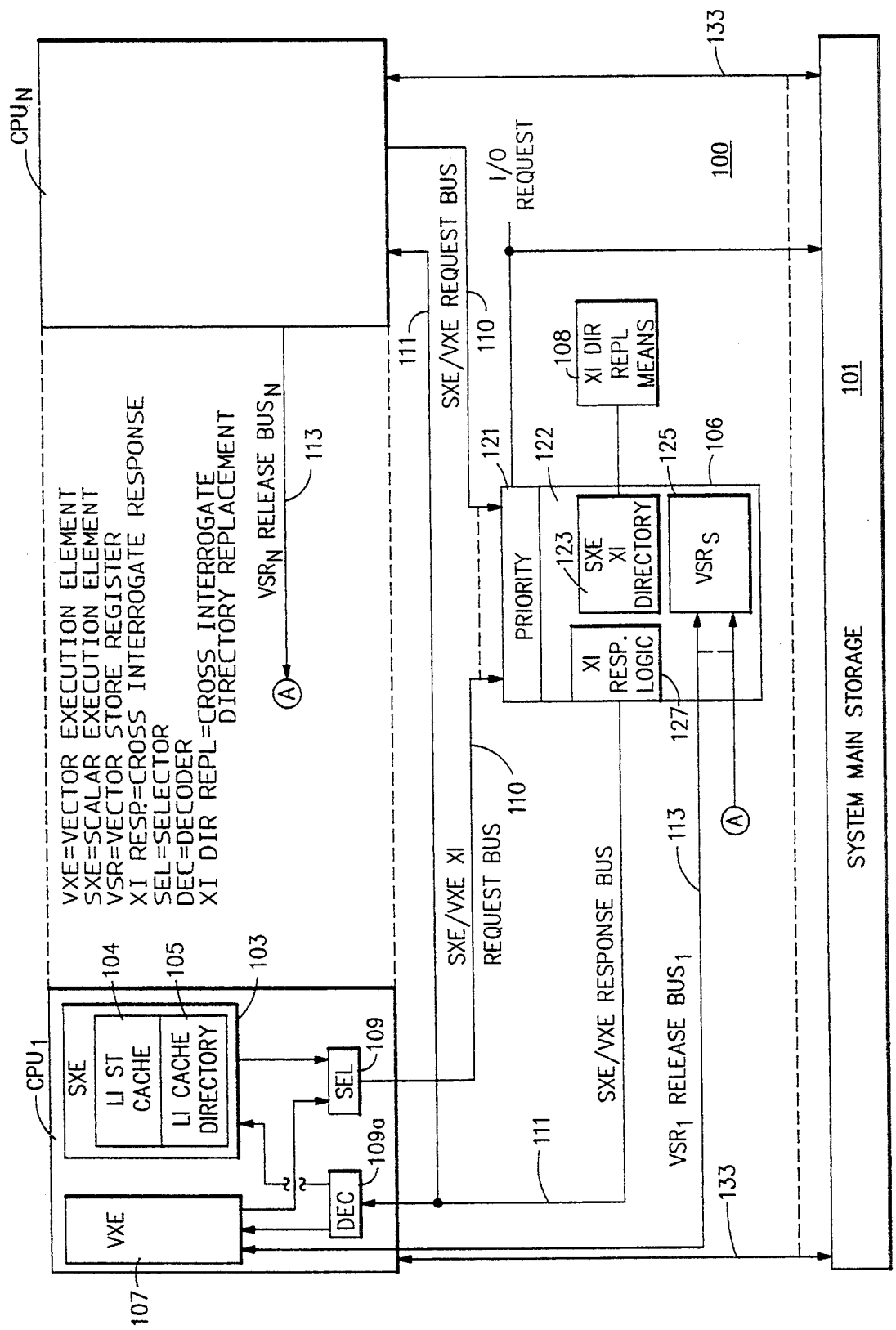
FIG. 1 is a block diagram or the high performance tightly coupled MP system according to the preferred embodiment of the present invention.

The present invention addresses and solves the requirement of ensuring cache coherency with a cross-interrogate (XI) mechanism capable of servicing very high VXE request traffic rates by providing a set of "VXE Store Register devices" (VSRs) that hold the address of system memory data units (or cache "lines") that a VXE is presently addressing to store data. These data units (DUs) are in increments of the cache line size (e.g. 128 contiguous bytes on 128 byte boundaries). The VSRs and how they are used to provide cache coherency in a multiple processor system are the subject of this invention.

There is an important "prerequisite" for using this invention. The VSR design mechanism must be used in conjunction with a centralized scalar cache invalidate directory method and means similar to that described in the aforementioned Gannon et al. U.S. Pat. No. 5,265,232 owned by the same assignee. That patent has all of its contents fully incorporated herein by reference and is considered part of this application. The aforementioned U.S. Pat. No. 5,265,232 is hereinafter referred to as Gannon et al. Gannon et al. also references patent application of Bean et al., Ser. No. 07/680,176, filed the same day, assigned to the same assignee and entitled "Ownership Interlock for Cache Data Units", all contents also fully incorporated herein by reference.

Gannon et al. describes a cache coherency mechanism wherein all requests to memory from first level caches are funneled through a centralized cache coherency directory (called an XI directory in Gannon et al.). In that application, VXE data requests (assuming that these processors contain VXEs) are funneled through each processor's data cache in a manner identical to any other type of data request.

In Gannon et al. all first level caches use a store through mechanism. That is, each processor stores data into its first level cache and concurrently stores that same data into system main memory. Processor stores are only allowed when the processor cache holds the addressed data "exclusive" Only one processor's cache in the multiple processor system is allowed to hold a cache data unit "exclusive" (having write authority), and if a single processor's cache holds a data unit exclusive then no other cache may hold that line with either exclusive or "read only" authority. However, any number of processor caches may hold a cache data unit with read only authority. Gannon et al. describes several embodiments of a cache coherency mechanism both with (FIG. 1 of Cannon et al.) and without (FIG. 9 of Gannon et al.) a single centralized second level cache. For the sake of simplicity this application will only show one embodiment for this invention wherein there is no second level cache. This is the embodiment of FIG. 9 of Gannon et al. For that embodiment Gannon et al. describes the means and methods for maintaining cache coherency for scalar data requests. Those same means and methods are assumed for scalar data requests in this application.

This invention provides a set of Vector Store Register devices (VSRs) for each Vector Execution Element in the system. Each set of VSRs (e.g. 256 VSRs per set) is associated with one and only one VXE. When the VXE is prepared to do an operand store directly to memory it must first obtain an empty VSR (through the XI Request Bus Interface—see applicants' FIG. 1) and be granted permission by a cross-interrogate (XI) logic (through a XI Response Bus Interface) to store to memory. Permission is only granted after any and all scalar cache holders of the respective cache data unit (e.g. cache line or block) have been marked invalid by the holding caches. Each VSR holds the real address of a cache data unit (DU) or line. Once a VSR has been obtained, the VXE may now store as many operands it has to store in that line or real memory. If the VXE is storing stride 1 (contiguous operands) then up to 16 contiguous FW (full word) operands or 32 contiguous DW (double word) operands may be stored using the same VSR. For strides other than 1, the number of stores "covered" under one VSR will decrease. For a 128 byte cache line size (DU) and strides greater than 16 (for FW operands), or 32 (for DW operands) the VSR is only good for one VXE store. A large set of VSRs are required to allow the VXE to obtain VSRs well before the time the VXE has computed the value of the actual store to memory. Thus, the pre-allocation of VSRs for future stores does not impact performance since the VXE will obtain VSRs well before it is ready to do the actual stores. Furthermore, the VXE has the information required to determine the number of operands "covered" by each VSR and the address to be placed in each VSR by the vector length and stride value contained in the vector instruction.

The obtaining of a VSR for doing one or more vector stores must go through the normal XI request mechanism since a central Data Integrity or Cache Coherency (or XI) Table must be accessed to determine if one or more scalar caches hold the required DU. If there are one or more cache holders, these must be invalidated before the requested VSR is marked as valid. In this respect the request by the VXE to get a VSR and thus obtain permission to write to memory is similar to a normal scalar cache exclusive request described in Gannon et al. When the VXE is done storing to the line of data covered by a VSR, however, the VXE can reset (release or free) that VSR independently of other activity in the XI centralized logic. Thus a single VXE can be concurrently getting one VSR and freeing another. This has the effect of doubling the request handling capacity of the XI logic for VXE traffic. This in itself is a major advantage in using this invention to maintain cache coherency.

Vector fetches need not use a VSR, or in any other way interface to the XI mechanism. Vector operand fetches merely fetch data from system memory without making any request to the Data Integrity logic. This is only possible because the first level scalar data caches are store through and therefore system memory is always logically coherent—that is, the most recent state of data is present in memory. If the caches used a store in algorithm then this would not be true.

In vector processing it is often true that one VXE is operating on, for example, even operands and another VXE is operating on odd operands. It is possible therefore that both VXEs could be simultaneously accessing through their separate VSRs the same line of real memory. The designer has two possible choices here:

(a) To allow both VXEs through their separate VSRs to concurrently store to the same line of real system memory.

(b) To allow only one VXE at a time to store to a given line of memory.

Although either choice is possible and clearly (b) is safest (since both VXEs could be storing to the same locations) we have nevertheless concluded that it would be far better from a performance viewpoint to implement alternative (a). There is little risk that an application would want to store through two separate VXEs to the same operand locations without interlocking that section of memory through the application or system software. Note that although concurrent VXE stores to the same line of memory is thereby allowed, it is not possible to allow any scalar cache to be holding any line or data that is being actively stored to by one or more VXEs (i.e. a line held in an active VSR).

XI requests made by scalar elements for Exclusive or Read Only access to a cache line goes to the XI logic via requests on the XI request bus. The XI logic will, in addition to checking for other cache holders of the at line (as described in Gannon et al.), also check all of the VSR Registers to see if that line is being stored into by any VXE. If that line is held by an active VSR (with the valid bit set on) then the XI logic must delay granting Exclusive or Read Only status for that line until all VXEs have "released" or inactivated that line.

FIG. 1 represents a multiple processor (MP) system 100 containing N central processing units, CPU 1 through CPU N, in which each CPU 1 through CPU N contains, for example, one scalar execution element (SXE) 103 with a private scalar cache 104 and directory 105, and one vector execution element (VXE) 107. The CPU may also contain a private instruction only cache which is read only and holds the CPU's instruction stream. If the CPU does contain an instruction cache, its requests to memory are made on the stone interface as used by the scalar cache and are indistinguishable from a scalar data cache request for read only data. For tile sake of simplicity, the preferred embodiment will not show an instruction cache.

In FIG. 1 each SXE 103 and VXE 107 has a cross-interrogate (XI) or data integrity (DI) request and response interface to the centralized cross-interrogate (XI) mechanism 106. This XI mechanism 106 includes a priority circuit 121, a scalar XI directory 123, vector store register (VSRs) devices 125 and XI response logic 127. SXE and VXE request buses 110 are coupled between the XI mechanism 106 and the SXE 103 and VXE 107 of each CPU. The requests from all the combined SXEs and VXEs of a CPU are separately applied over request buses 110 to priority circuit 121 which may be a queued cross-bar switch. All XI responses from the XI mechanism 106 are multidropped off bus 111 to the appropriate VXEs and SXEs. In addition, from each of the VXEs 107 there is a VSR release bus 113 to the XI mechanism 106 which is used as described previously to provide a release signal to free or reset VSR devices 125 that do not presently contain an active or valid memory line address. The XI directory can be replaced using replacement means 108. The main memory is 101. The store and fetch to and from VXE and from the SXE L1 cache 103 of each CPU 1 through CPU N is through store bus and fetch buses 133. In FIG. 1 all requests for system memory 101 from the SXE 103 are made through the scalar L1 cache 104 interface to memory and all requests from the VXE 107 do not go through a caching mechanism but are made directly to system memory 101. FIG. 1 of this application is a modification of FIG. 9 from Gannon et al. In the present invention, the XI mechanism 106 includes the vector storage register devices 125. In addition, there is the separate release bus 113 directly coupled between the vector execution elements (VXE) 107 and the VSR devices 125.

For M XI interleaves, the memory DUs or lines are divided in such a way that only 1/M of real system memory is referenced by a single XI interleave. The DUs are main memory data units of cache line size (for example, 128 contiguous bytes on 128 byte boundaries), and the DUs addresses refers to the addresses in main memory 101 of these data units (DUs). System memory DU addresses can be assigned to XI interleaves in any logical fashion, but a round robin method is considered preferable.

FIG. 1 also shows a priority circuit 121 which may be a conventional queued cross-bar which connects the XI request buses 110 from the N CPUs to the XI logic 122 for each of the M XI interleaves. Both the SXE 103 and the VXE 107 are coupled to bus 110 via selector 109. VSR release buses 113 from the VXEs 107 bypass the priority 121 since each VSR release bus will connect to every XI interleave. In general there should be sufficient XI interleaves to handle the expected peak traffic from the N CPUs. Each CPU is capable of generating two XI requests per machine cycle (one from the VXE and one from the SXE), however, traffic from the SXE should occur at a much lower frequency (since a request is only made from an SXE on a cache "miss")

The XI request bus 110 contains information fields as shown in FIG. 2 follows:

V=Valid bit to indicate that a request is active on the bus.

VXE=A bit to indicate that the request is from a VXE.

SXE=A bit to indicate that the request is from a SXE.

ID=The identity or the requesting SXE or VXE.

VSR ID=The requested VSR for a VXE request.

DU ADDR=The data unit address (line address) being refenced.

REQ TYPE=An encoded field with SXE request types as follows:

Read Only

Exclusive

Promote to Exclusive

Conditional Read Only

Invalidate acknowledgement.

Remote to Read Only acknowledgement.

Cast Out—referenced line has been removed from the L1 cache.

This message is generated at the vector execution unit VXE 107 or SXE 103 and sent over selector (SEL) 109 and buses 110 and is decoded at the XI mechanism 106. Selector 109 is a multiplexer.

The fields in the XI Response bus 111 are as shown in FIG. 3 and are as follows:

The V, VXE, SXE, ID, DU ADDR, and VSR ID fields as above.

RESPONSE TYPE: A encoded field with response types as follows:

VSR, Grant.

Read Only Grant.

Exclusive Grant.

Invalidate addressed DU entry.

Remote addressed DU entry to Read Only.

The response fields are generated at the XI mechanism 106 and sent over common bus 111 and SXE/VXE decoder (DEC) 109a to the VXE 107 and SXE 103. The message is decoded at the SXE 103 or VXE 107.

VXE or VSR Release bus fields of the message are shown in FIG. 4.

V=Valid request to inactivate a VSR is on the bus.

VXE ID=The identification of the VXE making the request.

VSR ID=The identification of the VSR to be inactivated.

This message is sent over the release bus 113, generated at the VXE 107 and decoded at the VSR device 125.

Figure 5:
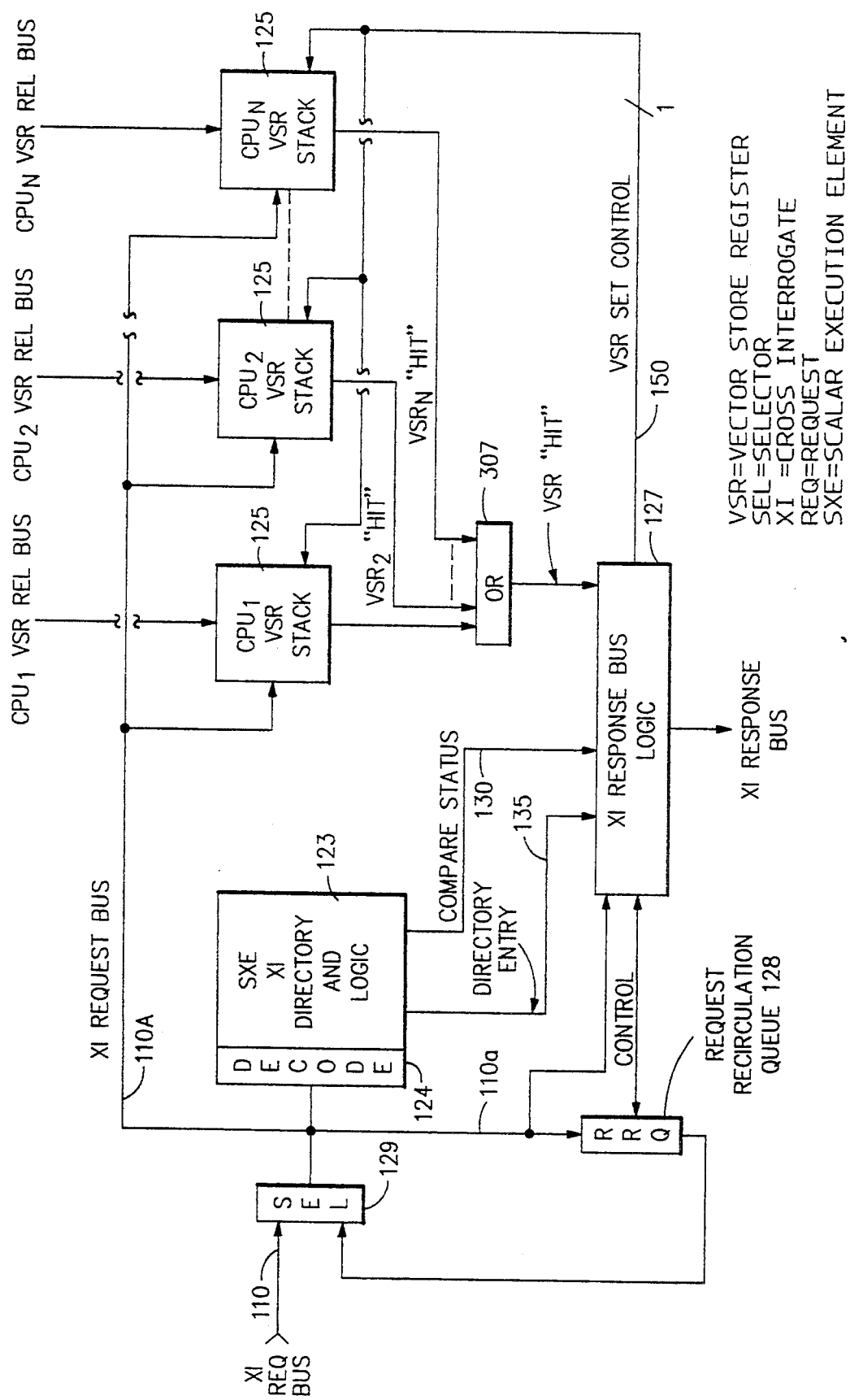
FIG. 5 is a diagram of the cross-interrogate logic for each interleave.
Figure 7:
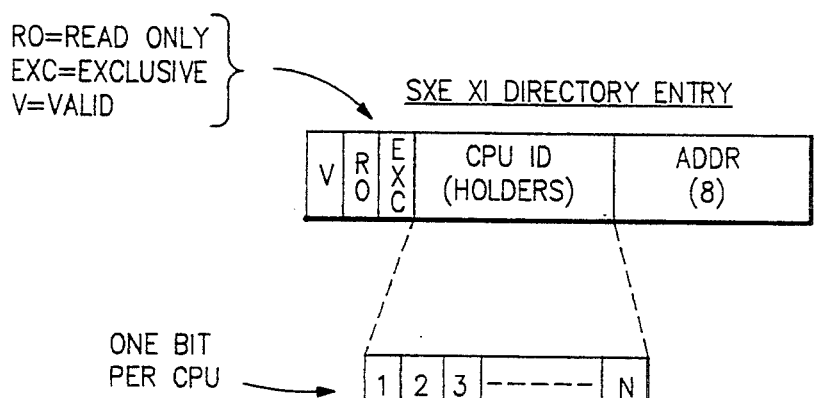
FIG. 7 illustrates the SXE XI directory entry.

FIG. 5 shows the logic contained within one XI Logic interleave of the XI mechanism. A XI request from either an SXE 103 or VXE 107 is generated in the format of FIG. 2 and presented on the XI request bus 110 via multiplex coupler 109 (FIG. 1) and connects via selector (SEL) 129 to the Scalar XI directory (or XI table) and Logic 123 and a set of VSR devices 125 for each VXE 107 in the system. FIG. 6 is a diagram of the SXE XI directory and logic 123. The request for the SXE XI directory is decoded by the decoder 124 to provide a control to the directory 126. The SXE XI directory 126 holds all entry for each unique cache line held by any scalar cache 103 in the system and is kept accurate by requests sent to the directory over bus 110 whenever there is a change in the cached memory addresses. FIG. 7 illustrates a SXE XI directory entry. The entry identifies the CPU holder ID, the status of Read Only or Exclusive, a valid bit (if valid), and the address. Thus, on any XI request the XI directory 123 is interrogated to determine if the requested DU (or cache line) is held Exclusive or Read Only or not held at all by any scalar cache as discussed in Gannon et al. In the SXE logic 123 interrogation, the high order DU address in each entry is compared with that on the bus at comparator 1129 to determine if there is a compare. The compare status is outputted on status line 130. The addressed directory entry without the address information is provided over bus 135 to the response bus logic 127. Concurrently, with the XI directory interrogation, the DU address in each active (or valid) VSR device 125 is compared against the address presented on the XI request bus 110a. This will then determine if any VXE is currently holding this memory location for ongoing vector stores. Responses to the XI request are encoded at logic 127 in the message format of FIG. 3 and multiplexed onto response bus 111. The XI responses on response bus 111 are decoded at decoders 109a and forwarded to VXE or SXE. Requests that cannot be responded to are put into the recirculation queue 128 under control from the logic 127. When permitted, the selector 129 changes state to allow requests from the queue 128 to be applied to the directory logic and VSRs.

Figure 8:
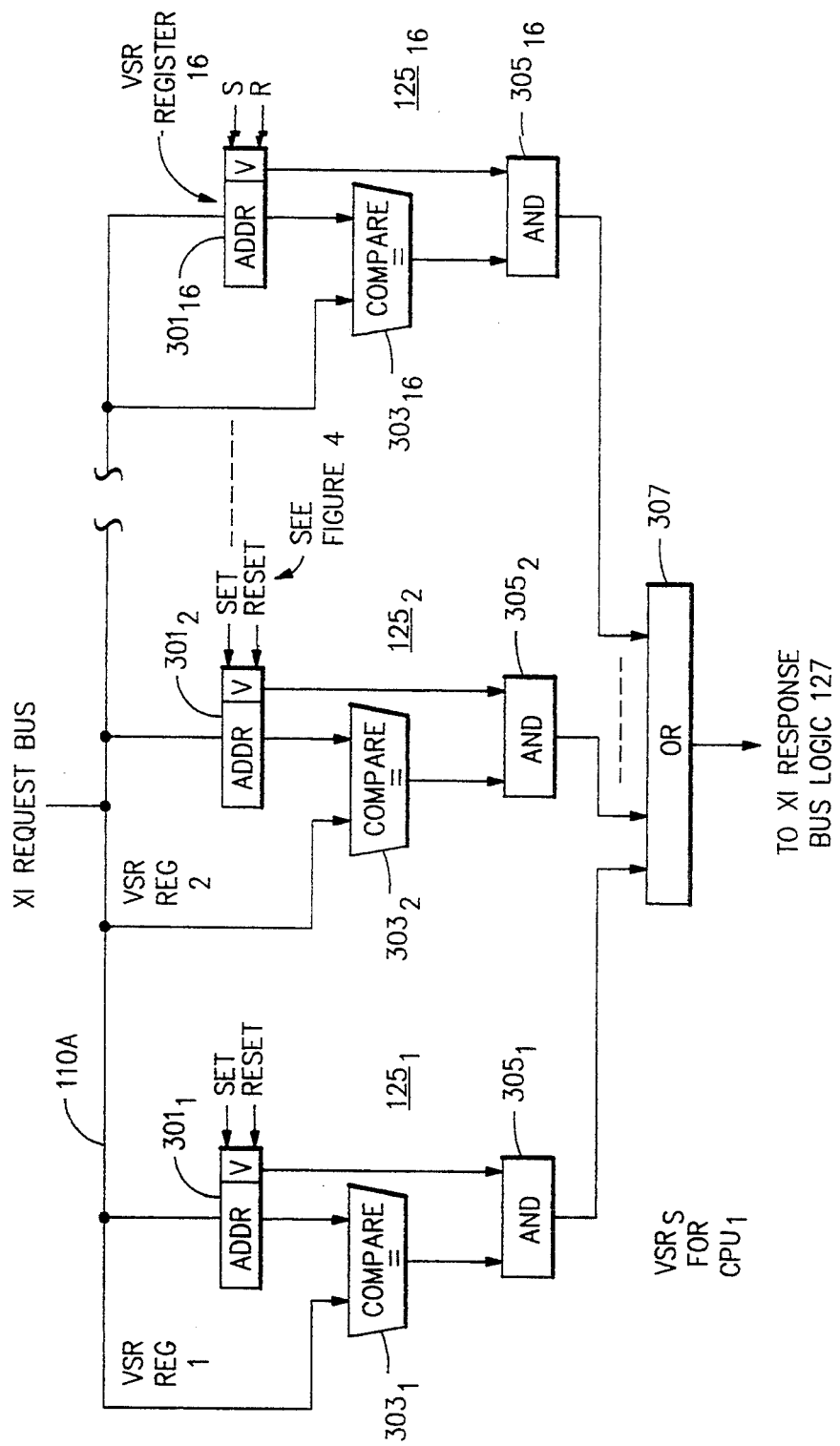
FIG. 8 is a logic diagram of the vector storage registers for each CPU.

FIG. 8 shows a single set of 16 VSR devices $125_1$ through $125_{16}$ for VXE $107_1$ wherein VSR devices $125_1$ through $125_{16}$ hold in registers $301_1$ through $301_{16}$ the line address of a line of system memory and a valid bit (or active bit) that determines if the address location is currently being used to store data by VXE $107_1$. Address compares with the valid bit reset are ignored since that VXE $107_1$ is not presently storing using that VSR. The valid bit is set when a VSR is obtained by a VXE through the XI request bus 110 and reset via a command from the VXE release bus. The address location currently held in the VSR $301_1$ through VSR $301_{16}$ is compared with the address on the request bus 110 at comparators $303_1$ through $303_{16}$ of the devices $125_1$ through $125_{16}$. No response out of AND gates $305_1$ through $305_{16}$ of the devices 125 occurs unless the valid bit is set and there is the compare. The output from these VSR devices $125_1$ through $125_n$ is coupled via OR gate 307 to logic 127

There are shown in this example 16 VSR1 devices, $125_1$ through $125_{16}$ per XI interleave. The number of registers per interleave is a design choice dependent on cost/performance trade-offs and VXE design characteristics.

Figure 9A:
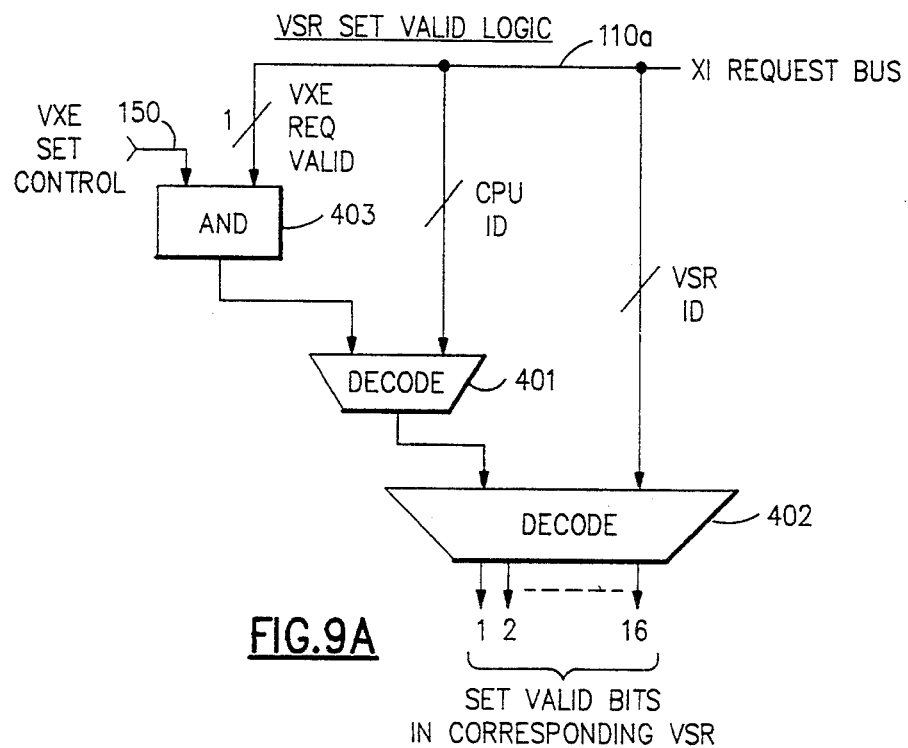
FIGS. 9A and 9B are respectively the VSR set and VSR reset valid logic
Figure 9B:
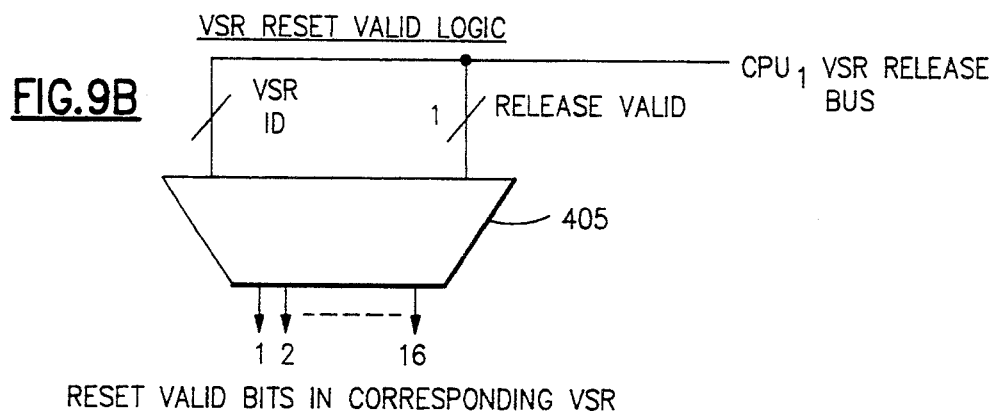

FIG. 9A shows the VSR set valid logic and FIG. 9B shows the VSR, reset valid logic per XI interleave required for the VSR's valid (V) bit. A valid bit for a particular register 301 of VSR device 125 is set whenever a VSR set control from logic 127 via 150 and an XI request on bus 110 from VXE 107 (format shown in FIG. 2) contains a valid VXE request at AND gate 403 to obtain a VSR device 125 and the VXE id (identification code) and VSR id fields from the XI request bus 110 decoded at decoders 401 and 402 to that VSR device. Even though the valid bit is set on the initial XI request from the VXE, the VXE will still not be permitted to begin memory operand stores until a scalar cache exclusive holder (if any) has invalidated the requested addressed line location and the VXE is then notified that it has store authorization for that line. This notification is accomplished through a response to the VXE sent on relevant XI response bus 111. This is determined by the compare status out of the SXE Directory and Logic 123. The response bus 111 interface (see FIG. 3)

contains a field identifying which VSR device has been so activated and, therefore, which memory line may now receive store requests.

Once notified that it has store authorization the VXE 107 will not relinquish (or free) the VSR device until all stores to that line have been completed. When the VXE 107 has completed the last store to that line (for the currently executing VXE instruction) it will release or free the VSR through generating a valid VSR release command through the VXE release bus 111. The target VSR device's valid bit is immediately reset upon receipt of a valid release command and after decoding the VSR id field at decoder 405 from the release bus. VSR devices are freed independently of other activity occurring in the XI mechanism. This is an important feature of this invention since a XI Request bus cycle is not required to inactivate a VSR, thus effectively doubling the VXE request rate processing capability of the XI logic.

Figure 10:
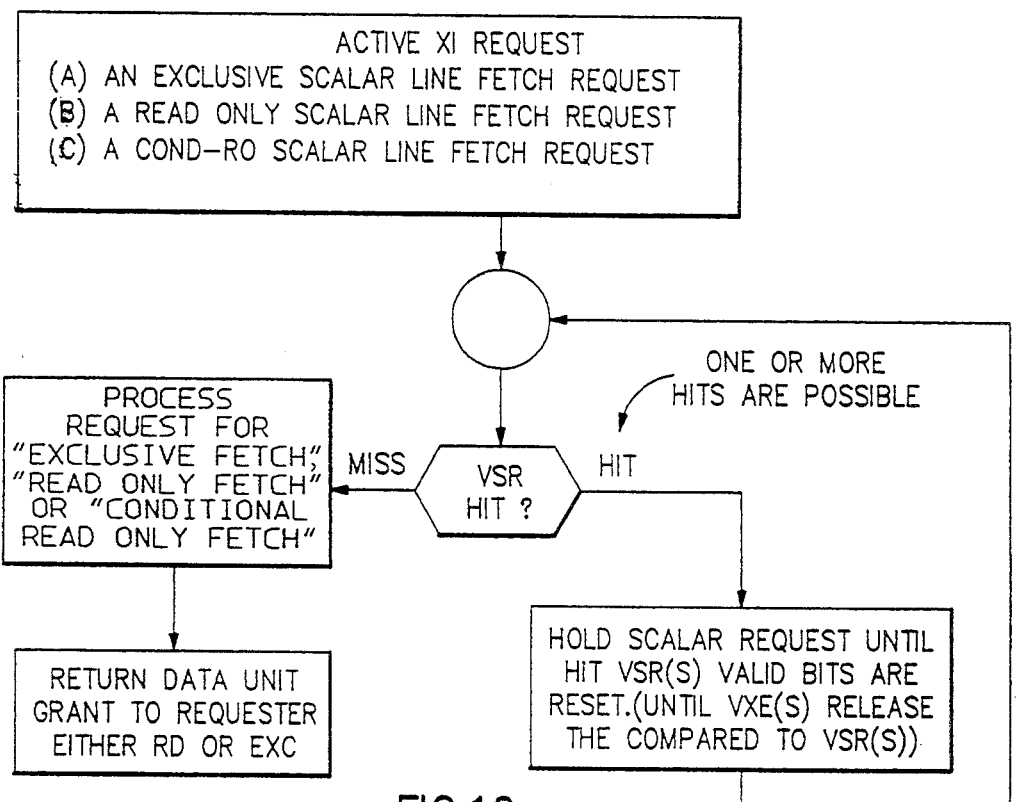
FIG. 10 is a flow chart of the XI mechanism algorithm on receiving a scalar exclusive read only or conditional read only request from an SXE XI request bus.

FIG. 10 is a flowchart of the XI response logic 127 operation in response to receiving an active scalar Exclusive, Read Only or Conditional Read Only line fetch request from an SXE XI request on bus 110. These are the same as shown and discussed in FIGS. 12A, 12B, and 12C of Gannon et al., respectively. The DU addresses contained in all VSR devices 125 are compared at the compares 303 against the request DU address and if there is a hit, that is provided to the logic 127. If there is a compare (a VSR "hit") then the scalar request at logic 127 is held in the request recirculation queue or register 128 until all VSR devices 125 holding the requested address are released. At that time the VSR devices 125 are again interrogated (in case another VSR activated the same address) and if there are now no VSR hits, the request proceeds through select 129 to directory 123 as in the flowcharts (FIGS. 12a, 12b, and 12c) shown in Cannon et al., eventually resulting in a DU "grant" (either Read Only or Exclusive as requested) sent back to the requesting SXE on the XI response bus 111. It is the usual case that SXE requests will be for different areas of system memory and VSR hits should be rare. Note also that the SXE case to "promote to exclusive" (FIG. 12d from Cannon et al.) and the case to invalidate or remove an entry in the XI (FIG. 12e) work as shown in Gannon et al. since no VSR devices could possibly be active for these cases.

Figure 11:
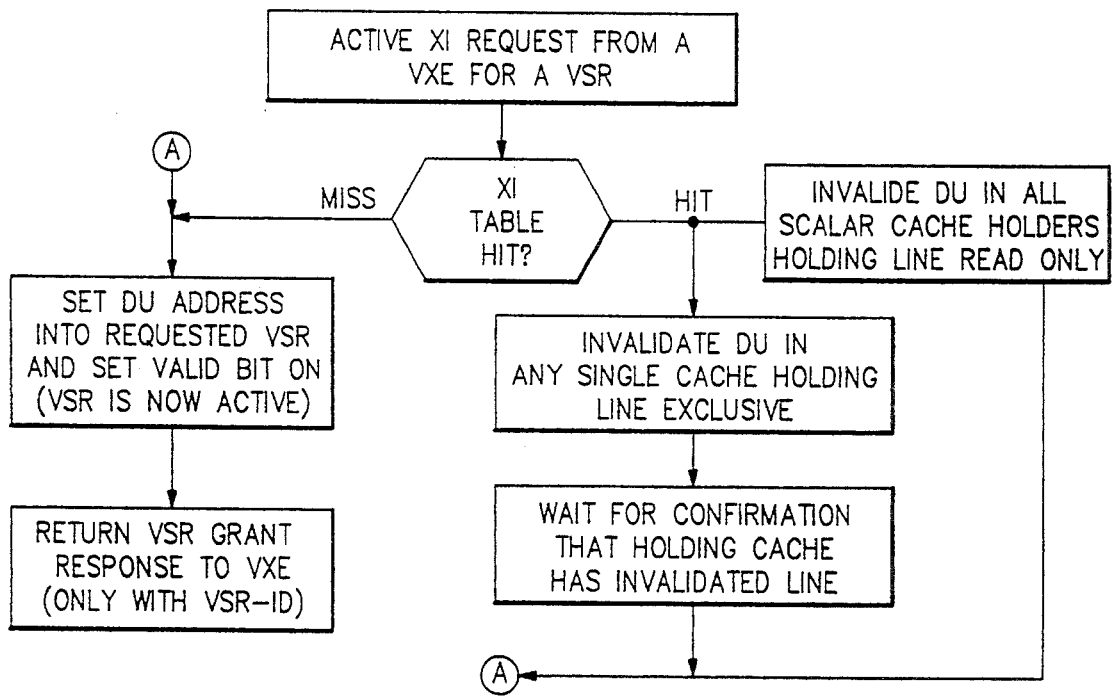
FIG. 11 is a flow chart of the XI algorithm for a VXE request.

FIG. 11 is a flowchart of the XI response logic 127 operation for a VXE request. The scalar XI directory (or table) 123 is accessed to determine if there are any cache holders of the requested line. If not as detected out of compare status line 130 then the address on the XI request bus 110a from the VXE 107 is placed in the requested VSR device by the VSR set control and the valid bit is set to indicate that this VSR now contains a valid DU address being stored into by a VXE. The set control is applied via lead 150 to the CPU VSRs to AND gate 403 as shown in FIG. 1 to set valid bits in corresponding VSR. If a "hit" occurs (that is, at least one scalar cache holds the requested data unit) then the requested VSR is not "activated" (see below for definition) until after all Read Only cache holders have been notified to invalidate the referenced data unit (no response required) and any exclusive holder is notified to invalidate the referenced DU and a response has been received from that exclusive holder that the data unit has been removed from the cache. The latter response for exclusive holders is required to allow any scalar stores in progress to complete prior to invalidating the addressed line or DU. The VXE request is stored in the request recirculation queue 122. When these scalar actions have been completed the VSR is then "activated". The VSR request may be gated out of select 129 and if no hit on XI response to VXE on bus 111 and a VSR set control. Note that the request address may be always placed in the VSR when the request is first placed on the XI request bus. Only the timing of the activation of that VSR is important. The VSR is "activated" only after the requesting VXE has received (via the XI response bus) a response indicating that it has store permission to the DU in that VSR, (i.e., a VSR grant).

Advantages of this Invention over Prior Art

Past hardware means of handling the high traffic rates for vector XI requests have either been nonexistant because there are no conventional first level caches in the MP system, or as in Gannon et al. where there are first level caches, all vector traffic goes through these caches seriously degrading both SXE and VXE performance for applications making significant use of the vector processing.

For high performance vector processing of large scientific applications VXE requests must interface directly to system memory (bypassing the scalar cache). Granted tiffs assertion then the alternative of having no VSRs (or similar mechanism) implies that all VXE traffic must use entries in the central XI directory. This would have a serious impact on system performance, primarily because the XI directory would have to be accessed at least three times for every vector request, once to interrogate the XI directory for scalar holders, once to store the address of the line being used by the VXE into the XI directory and once to remove the VXE DU address from the directory. Also, a high percentage of XI directory would be occupied by VXE entries. With VXE requests potentially occurring at a rate of one per machine cycle per VXE, the solution without VSR's becomes impractical if optimal vector performance is a design requirement. With VSR's the XI directory need be accessed only once to determine SXE holders of the requested DU.

While the invention has been particularly shown and described with reference to preferred embodiments thereof, it will be understood by those skilled in the art that various changes in form and details may be made therein without departing from the spirit and scope of the invention.

We claim:

1. In a combined vector and scalar processing system including scalar and vector processor elements, a common memory,
   storing and fetching data units between said processing elements and said memory following fetch or store requests and responses, the improvement of cross-interrogate (XI) means comprising, in combination:
   a scalar XI directory containing entries identifying any scalar processor having ownership of a data unit and an address representation for locating the data in said memory, said scalar XI directory providing responses to said processor's request to permit access when no scalar processor element has ownership; and
   vector storage register devices containing addresses representing lines currently being stored into by the vector processor elements and responsive to said processor element requests for said addresses for holding any responses normally provided from the scalar XI directory.

2. The combination of claim 1 wherein each of said vector store register devices includes a register and a comparator for comparing the incoming scalar address and vector request address with that address stored in said register.

3. The combination of claim 2 including means responsive to the presence of a vector request address not currently being held by said vector store register device or in said scalar XI directory for setting said data unit address into a vector store register device.

4. The combination of claim 3 wherein a valid bit is set in said vector store register device.

5. The combination of claim 3 wherein said vector processor elements send a release signal to said vector store register devices when finished processing the associated vector processor instruction and wherein said vector store register device is reset by said release signal.

6. The combination of claim 5 wherein said XI response from said scalar XI directory is held until said release signal is applied to said vector store register device.

7. A combined scalar and vector processing system comprising:
 a plurality of scalar processors, each scalar processor, when fetching or storing a data unit, sending cross-invalidate (XI) request signals and waiting to act in response to XI response signals;
 a plurality of vector processors, each vector processor, when fetching or storing a data unit, sending XI request signals and waiting to act in response to XI response signals and for providing a release signal when said vector processor is finished processing the associated vector processor instruction;
 a common memory;
 a scalar XI directory having a plurality of entries for receiving requests from said scalar and vector processors, each entry identifying a scalar processor having ownership over a data unit and an address representation for locating said data unit in memory, said directory having comparator means for comparing incoming scalar and vector processor requests from said processors for providing a first compare signal when there is a compare;
 a plurality of vector store register devices for storing addresses representing lines currently being stored into by said vector processors in response to a set signal, said vector store register devices including store means, compare means for providing a second compare signal when said stored address compares with a vector or scalar line request, said vector store registers being reset by said release signal;
 means for providing said scalar and vector processor XI requests to said directory and said vector store register devices and means for coupling said release signals directly to said vector store register devices;
 means responsive to said first and second compare signals for, in response to no first compare signal and the presence of a request for a vector store register from a vector processor, providing said set signal to a requested vector store register device to store into the requested vector store register device and for, in response to said second compare signal, holding said scalar responses until said vector store register devices are reset by a release signal from said vector processors.

8. The system of claim 7 wherein there are a plurality of said vector store register devices for each vector processor.

9. The system of claim 8 wherein said means for coupling said release signals includes vector store reset logic for decoding the appropriate vector store register device to be reset.

10. The system of claim 9 wherein said means for providing said set signal includes means coupled to said XI request bus for decoding the appropriate vector store register device.

11. The system of claim 8 wherein when there is no second compare signal sending said response to said processors.

12. The system of claim 7 wherein there is a cache associated with each scalar processor, each cache having either exclusive authority or read only authority, and, when there is a first compare signal, invalidating a data unit in any single cache holding a line with exclusive authority, waiting for confirmation that the cache holding the line with exclusive authority has invalidated said line before providing said set signal, and then invalidating said data unit in all cache, holding the line with read only authority.

13. The system of claim 12 wherein when there is a first compare, waiting for confirmation that the holding cache has invalidated the line before sending the set signal.

14. The system of claim 7 wherein said means responsive to said first and second compare signals include means for storing held scalar responses until released by said release signal.

15. The system of claim 14 wherein said requests are held in a queue until said release signal whereupon said requests are re-applied to said scalar directory and said vector store register devices.

16. A method of providing coherency of data in a system including a plurality of scalar processors with store through caches, backing memory a scalar directory, vector store register devices, and a plurality of vector processors comprising the steps of:
 storing in said scalar directory, address representations for data units in said backing memory for said scalar processors, and scalar identification of the cache holding said data;
 sending line requests from said vector and one scalar processors for data units;
 comparing said line requests from said vector and scalar processors at said scalar directory and said vector store register devices;
 if there is not a compare at said scalar directory, setting address representations for data units in said backing memory in one of said vector store register devices; and
 if there is a compare at a vector store register device identifying that vector store register device as a using vector store register device which is using one of said data units, holding a response to the scalar processor which sent the line request until said using vector store register device has finished using said one data unit.

17. The method of claim 16 further comprising the steps of:
 fetching from said backing store in response to a line request from the vector processors, said one data unit; and upon finishing fetching of said one data unit, providing a release signal from the vector processor which sent the line request directly to said using vector store register device to thereby reset said using vector store register device, indicating said using vector store register device has finished using said one data unit.

18. Coherence means for data processing comprising:

a plurality of CPUs each having a scalar execution element (SXE) and a vector execution element (VXE), each SXE having a store through cache and associated cache directory, each SXE and VXE when storing and when said SXE is fetching sending cross-interrogate (XI) request signals and acting in response to XI response signals, VXEs further sending release signals when said VXEs are finished with a data unit;

a SXE coherence directory having a plurality of entries for receiving requests from said SXEs and VXEs, each entry identifying the holder of cached lines in said store through caches, if exclusive, and an address representation for locating an associated data unit in a backing memory;

vector store register devices (VSRs) for each VXE, each vector store register device (VSR) holding a real address of an associated data unit currently being stored into by said VXE in response to a set signal and said VSRs releasing said address in response to a release signal;

said SXEs and VXEs providing line XI requests to said SXE directory and said VSRs and directly providing release signals to said VSRs;

said SXE coherence directory comparing said SXE and VXE requests with those in said directory for providing a first compare signal and directory entry information if there is a match;

said VSRs comparing said SXE and VXE line requests to that stored in the VSR for providing a second compare signal for a compare; and means responsive to said no first compare and the presence of an XI request from said VXE for providing a set signal to a requested VSR to store into the requested VSR and for in response to said second compare signal holding said scalar XI responses until said VSRs are reset by said release signal.

19. The coherence means of claim 18 wherein said means for providing said release signal includes vector store reset logic for decoding the appropriate vector store register to be reset.

20. The coherence means of claim 19 wherein said means lot providing said set signal includes means coupled to said XI request bus for decoding the appropriate vector store register device.

21. The coherence means of claim 18 wherein said requests are held in a queue until said release signal whereupon after said release signal said requests are re-applied to said SXE directory and said vector store register devices.

* * * * *